United States Patent
Reid et al.

(10) Patent No.: US 12,340,004 B2
(45) Date of Patent: Jun. 24, 2025

(54) METHOD AND SYSTEM FOR SECURE COMMUNICATION

(71) Applicant: Texas Instruments Incorporated, Dallas, TX (US)

(72) Inventors: Stephen Lindor Reid, Dallas, TX (US); Prithvi Narayana Rao, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 997 days.

(21) Appl. No.: 15/279,389

(22) Filed: Sep. 28, 2016

(65) Prior Publication Data

US 2018/0089466 A1 Mar. 29, 2018

(51) Int. Cl.
*G06F 21/72* (2013.01)
*G06F 21/60* (2013.01)
*H04L 9/32* (2006.01)

(52) U.S. Cl.
CPC ............ *G06F 21/72* (2013.01); *G06F 21/606* (2013.01); *H04L 9/3273* (2013.01); *H04L 9/3297* (2013.01)

(58) Field of Classification Search
CPC ..... G06F 21/72; G06F 21/606; H04L 9/3273; H04L 9/3297
See application file for complete search history.

(56) References Cited

U.S. PATENT DOCUMENTS

| | | | | |
|---|---|---|---|---|
| 7,330,702 B2* | 2/2008 | Chen | ........................ | H04B 1/38 257/725 |
| RE43,323 E * | 4/2012 | Jurgensen | ......... | H04W 74/0866 370/468 |
| 8,190,784 B1* | 5/2012 | Raizen | .................. | G06F 3/0604 710/305 |
| 2004/0258136 A1* | 12/2004 | Liu | ...................... | H04B 1/7156 375/354 |
| 2005/0251579 A1* | 11/2005 | Ngo | ...................... | G07C 5/085 709/234 |
| 2008/0150698 A1* | 6/2008 | Smith | ................ | G06K 19/0723 340/10.4 |
| 2009/0290316 A1* | 11/2009 | Kariya | .................... | H01L 23/50 361/767 |

(Continued)

OTHER PUBLICATIONS

OpenFSI Specification Field Replaceable Unit Service Interface Workgroup Specification Revision 0.9.5 (Aug. 16, 2016), pp. 1-42.*

(Continued)

*Primary Examiner* — Luu T Pham
*Assistant Examiner* — Canh Le
(74) *Attorney, Agent, or Firm* — Charles F. Koch; Frank D. Cimino

(57) ABSTRACT

A method for secure communication between an initiator and a recipient is provided that includes sending to the recipient by the initiator a command packet, the command packet including a randomly generated time offset designating a time window in which the initiator expects to receive a response packet from the recipient, and receiving by the initiator in response to the command packet a response packet from the recipient, the response packet including a randomly generated time offset designating a time window in which the recipient expects to receive a subsequent command packet from the initiator.

17 Claims, 5 Drawing Sheets

(56) References Cited

U.S. PATENT DOCUMENTS

| | | | | |
|---|---|---|---|---|
| 2010/0235550 | A1* | 9/2010 | Bolton | G06F 13/385 |
| | | | | 710/62 |
| 2013/0005273 | A1* | 1/2013 | Kips | H04W 74/04 |
| | | | | 455/39 |
| 2013/0212311 | A1* | 8/2013 | Hunsaker | G06F 11/1072 |
| | | | | 710/110 |
| 2014/0286621 | A1* | 9/2014 | Matsunaga | G09B 19/0038 |
| | | | | 386/241 |
| 2014/0287792 | A1* | 9/2014 | Rainisto | H04W 4/08 |
| | | | | 455/519 |
| 2015/0334533 | A1* | 11/2015 | Luo | H04M 1/72457 |
| | | | | 455/406 |
| 2018/0089466 | A1* | 3/2018 | Reid | H04L 9/3273 |
| 2018/0242916 | A1* | 8/2018 | Purdon | A61B 5/291 |
| 2018/0359659 | A1* | 12/2018 | Cai | H04W 72/52 |
| 2019/0036874 | A1* | 1/2019 | Sun | H04L 12/403 |

OTHER PUBLICATIONS

David Slogsnat et al., "An Open-Source HyperTransport Core," Sep. 2008, pp. 1-21. (Year: 2008).*
Joseph V. Cordaro et al., "Ultra Secure High Reliability Wireless Radiation Monitoring System," Dec. 2011, pp. 14-18. (Year: 2011).*
Andreas Herkersdorf et al., "Cross-Layer Dependability Modeling and Abstraction in System on Chip", 2013, pp. 1-7 (Year: 2013).*
Sheng Xiao, "Secure Wireless Communication with Dynamic Secrets," 2010, pp. 1-9 (Year: 2010).*

* cited by examiner

METHOD AND SYSTEM FOR SECURE COMMUNICATION

BACKGROUND OF THE INVENTION

Field of the Invention

Embodiments of the present invention generally relate to secure communication of sensitive data.

Description of the Related Art

Protection of sensitive information such as encryption keys and passwords when the sensitive data is communicated to an application is very important. Hackers may employ emulation tools in an attempt to access and analyze such communications to ascertain the sensitive information. Such tools allow hackers to analyze software implementing the communication protocol used without a significant risk that observation of the protocol will cause the protocol to fail.

SUMMARY

Embodiments of the present invention relate to methods and systems for secure communication. In one aspect, a method for secure communication between an initiator and a recipient is provided that includes sending to the recipient by the initiator a command packet, the command packet including a randomly generated time offset designating a time window in which the initiator expects to receive a response packet from the recipient, and receiving by the initiator in response to the command packet a response packet from the recipient, the response packet including a randomly generated time offset designating a time window in which the recipient expects to receive a subsequent command packet from the initiator.

In one aspect, an apparatus is provided that includes a secondary security processor configured to store sensitive data, and a primary processor coupled to the secondary security processor, wherein the primary processor and the secondary security processor are configured to execute a random time window protocol to communicate sensitive data in which, in accordance with a random time window protocol, the primary processor is configured to send a command packet to the secondary security processor, the command packet including a randomly generated time offset designating a time window in which the primary processor expects to receive a response packet from the secondary security processor, and receive in response to the command packet a response packet from the secondary security processor, the response packet including a randomly generated time offset designating a time window in which the secondary security processor expects to receive a subsequent command packet from the primary processor.

In one aspect, an apparatus is provided that includes a first processor configured to use a random time window protocol for communication with a second processor, and the second processor coupled to the first processor via a communication interface, the second processor configured to use the random time window protocol for communication with the first processor, wherein the random time window protocol is a command response protocol in which a randomly generated time offset designating a time window for transmission of a subsequent packet is included in packets of a communication sequence between an initiator of the communication sequence and a recipient of the communication sequence.

BRIEF DESCRIPTION OF THE DRAWINGS

Particular embodiments in accordance with the invention will now be described, by way of example, and with reference to the accompanying drawings.

DETAILED DESCRIPTION OF EMBODIMENTS OF THE INVENTION

Figure 1:
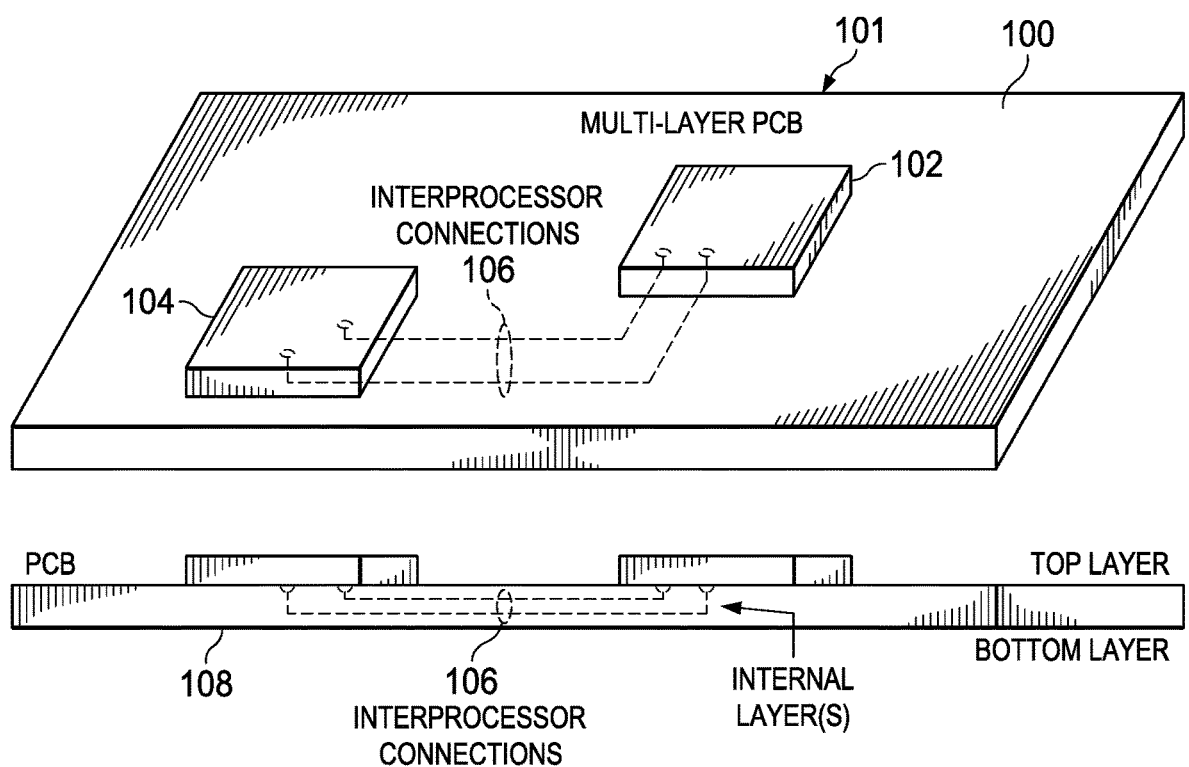
FIG. 1 shows top and side views of an example multi-layer printed circuit board (PCB) configured to use a random time window protocol for secure communication of sensitive data.

Specific embodiments of the invention will now be described in detail with reference to the accompanying figures. Like elements in the various figures are denoted by like reference numerals for consistency.

Some embodiments of the disclosure provide for secure communication of sensitive data on a multi-layer printed circuit board (PCB) that may prevent hackers from using an emulation tool to observe the communication protocol used and thus capture the sensitive data. In such embodiments, the multi-layer PCB includes a primary processor and a secondary security processor for management of the sensitive data, e.g., passwords and/or private keys for public key encryption. The two processors are coupled by lines, i.e., a communication interface, in one or more internal layers of the PCB such that no external access to the communication interface is possible without destroying the PCB. Further, the communication between the two processors is performed using a random time window protocol. As will be apparent from the description herein, the random time window protocol, when implemented on a multi-layer PCB in which external access to the communication signals is not possible, reduces the risk of external protocol analysis.

FIG. 1 shows top 100 and side 108 views of an example multi-layer PCB 101 configured to use a random time window protocol as described herein for secure communication of sensitive data. Embodiments of the PCB 101 may be used, for example, in digital devices such as a calculator, a tablet, or a smart phone. The multi-layer PCB 101 including a primary processor 102 coupled to a secondary security processor 104 via inter-processor connections 106. As is illustrated in the side view 108, the inter-processor connections 106 are in one or more internal layers of the multi-layer PCB 101. Ball-grid or other suitable processor packaging may be used to prevent access to the signals on the inter-processor connections 106.

The primary processor 102 is configured to execute operating system and application software, some of which may need access to secure data, e.g., passwords and/or encryption keys, maintained by the secondary security processor 104. The primary processor 102 may be any suitable general purpose processor.

The secondary security processor 104 is configured to store the sensitive data, e.g., one or more passwords and/or one or more encryption keys and to communicate stored sensitive data to the primary processor 102 upon request. The secondary security processor 104 may be any suitably configured general or special purpose processor. In some embodiments, the sensitive data may be stored in read-only-memory (ROM) with access to the ROM controlled by the secondary security processor 104. In some embodiments, the sensitive data may be stored in random access memory (RAM) with access to the RAM controlled by the secondary security processor 104. In such latter embodiments, the primary processor 102 may provide the sensitive data to the secondary security processor 104 for storage. For example, a user may specify a password via an interface presented by application software executing on the primary processor 102 and the primary processor 102 may communicate the password to the secondary security processor 104 for storage.

All communication regarding the sensitive data between the primary processor 102 and the secondary security processor 104 regarding the sensitive data is performed via the inter-processor connections 106. Further, the communication is performed using a random time window protocol. Software instructions implementing this protocol are executed both on the secondary security processor 104 and the primary processor 102.

The random time window protocol is a command-response based communication protocol in which an initiator (host) controls the start and end of a communications sequence with a recipient (client). The initiator sends commands to the recipient and the recipient sends responses to the commands. In some embodiments, the primary processor 102 is the initiator and the secondary processor 104 is the recipient. Further, with a few exceptions explained herein, each communication from the initiator to the recipient and from the recipient to the initiator specifies when the next communication is expected, i.e., the start of time window when a next communication will be accepted. Any subsequent communication prior to the arrival of the specified time window is ignored.

In some embodiments, there is an implementation specific variance around the expected start time of the specified time window to compensate for minor variance in the time base of the initiator and the recipient. For example, if time windows are specified to be at a resolution of one millisecond, a variance of some implementation specific percentage of the width of the time window may be used.

The start of the time window is specified as a time offset that is randomly generated within a fixed offset range. The range used may be based on how fast the protocol should operate. For example, if the time units are milliseconds (ms), and the size of the time window is 1 ms, the offset range may be between 5 ms and 150 ms inclusive.

The width of a time window during which a protocol packet will be received is pre-defined and implementation specific. The selected width should take into account variance in timers of the communicating devices, e.g., variance between the respective timers of the primary processor 102 and the secondary security processor 104. The selected width should also take into account the maximum anticipated command and response pair sequence, including communication of multiple packets. The selected width should also take into account the desired operation speed of the protocol and the maximum size of a packet.

A simple packet format is used for sending commands and responses. The maximum size of a packet is predetermined. Criteria to be considered in determining the maximum packet size include the selected time window width and the speed of the communicating processors. Packets may be variable length up to the maximum packet size. A packet may include a command or response and other data depending upon the particular command or response, i.e., the particular command or response in a packet may be used to determine the format of the following data in the packet. Any suitable command response protocol can be used within the random time window protocol by "wrapping" the command response protocol data packets with fields for a time window protocol handler. As will be evident from the description below, the START and END packets are essentially "markers" signaling the beginning and the end of using the random time window protocol.

The initiator begins a communication sequence with a START command to the recipient with no response time window. The START command may be an asynchronous command that is acknowledged by the recipient and resets any communication sequence currently in progress. An immediate ACK response to this command is expected from the recipient. The response from the recipient includes the time offset to the time window when the recipient expects the next command from the initiator. Any communication from the initiator to the recipient subsequent to sending the response is ignored until the specified time window arrives.

The initiator ends a communication sequence either by sending another START command to the recipient or by sending an END command to the recipient. The END command includes the time offset to the time window when the initiator expects an ACK response from the recipient acknowledging the END command. Any communication from the recipient to the initiator subsequent to sending the END command is ignored until the specified time window arrives. The ACK response acknowledging an END command includes no time offset.

The recipient ignores all communications from the initiator until a START command is received. The recipient generates an immediate ACK response to a START command that includes the time offset to the time window when the recipient expects the next command from the initiator. Each subsequent command from the initiator, except a START command, includes the time offset to the time window when the initiator expects a response from the recipient. Any communication from the recipient to the initiator subsequent to sending a command is ignored by the initiator until the specified time window arrives. Further, each subsequent response by the recipient, except an ACK response sent in response to an END command, includes the time offset to the time window when the recipient expects a command from the initiator. Any communication from the initiator to the recipient subsequent to sending a response is ignored by the recipient until the specified time window arrives.

In some embodiments, based on the maximum packet size and the anticipated size of the data to be communicated, the initiator or recipient may determine that multiple packets are required. In such a case, multiple packets are sent over two or more time windows. For example, if the initiator needs to send data to the recipient that exceeds the maximum packet size, as defined by the implementation, the initiator sends the data in a series of packets in which each packet includes a subset of the data and each packet except the final packet includes a time offset indicating when the recipient will receive the next packet of the series. The command in the initial packet indicates that multiple packets will be transmitted. The command in each of the subsequent packets indicates that the packet is part of the multi-packet communication. The final packet in the series includes a time offset indicating when the initiator expects to receive a response from the recipient.

The determination of when a final packet has been received by the recipient is implementation specific. For example, the initial packet may include a field indicating the total data length such that the recipient will recognize when a final packet of the series has been received based on the amount of data received. In another example, flags within each packet in the series may be used to indicate first packet, second packet, etc.

In another example, if the recipient needs to send data to the initiator that exceeds the maximum packet size, the recipient sends the data in a series of packets in which each packet includes a subset of the data and each packet except the final packet includes a time offset indicating when the initiator will receive the next packet of the series. The initial response packet indicates that multiple packets will be transmitted. The response in each of the subsequent packets indicates that the packet is part of the multi-packet communication. The final packet in the series includes a time offset indicating when the recipient expects to receive a command from the initiator.

The determination of when a final packet has been received by the initiator is implementation specific. For example, the initial packet from the recipient may include a field indicating the total data length such that the initiator will recognize when a final packet of the series has been received based on the amount of data received. In another example, flags within each packet in the series may be used to indicate first packet, second packet, etc.

Figure 2:
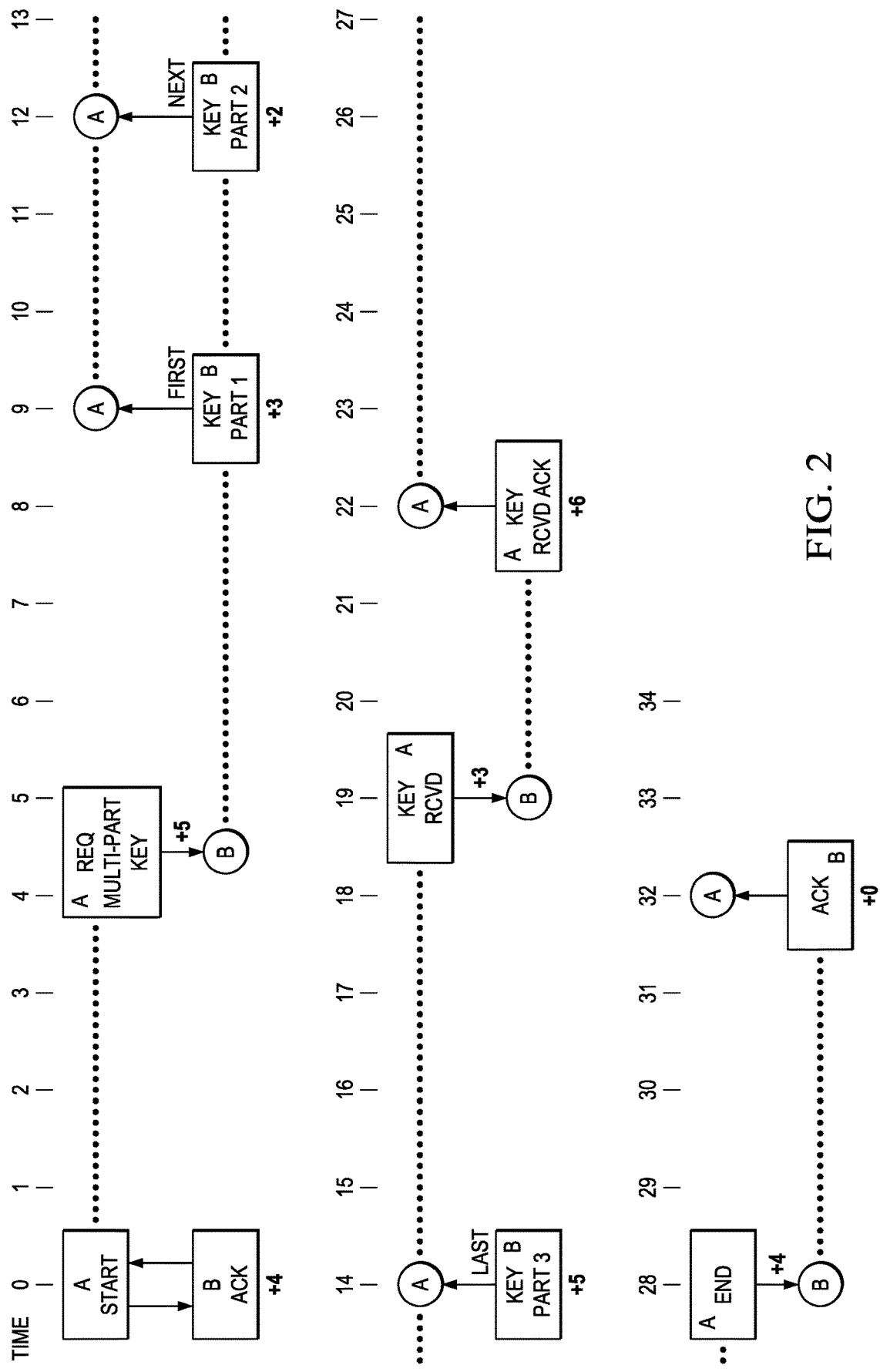
FIG. 2, FIG. 3, and FIG. 4 are examples illustrating operation of the random time window protocol.
Figure 3:
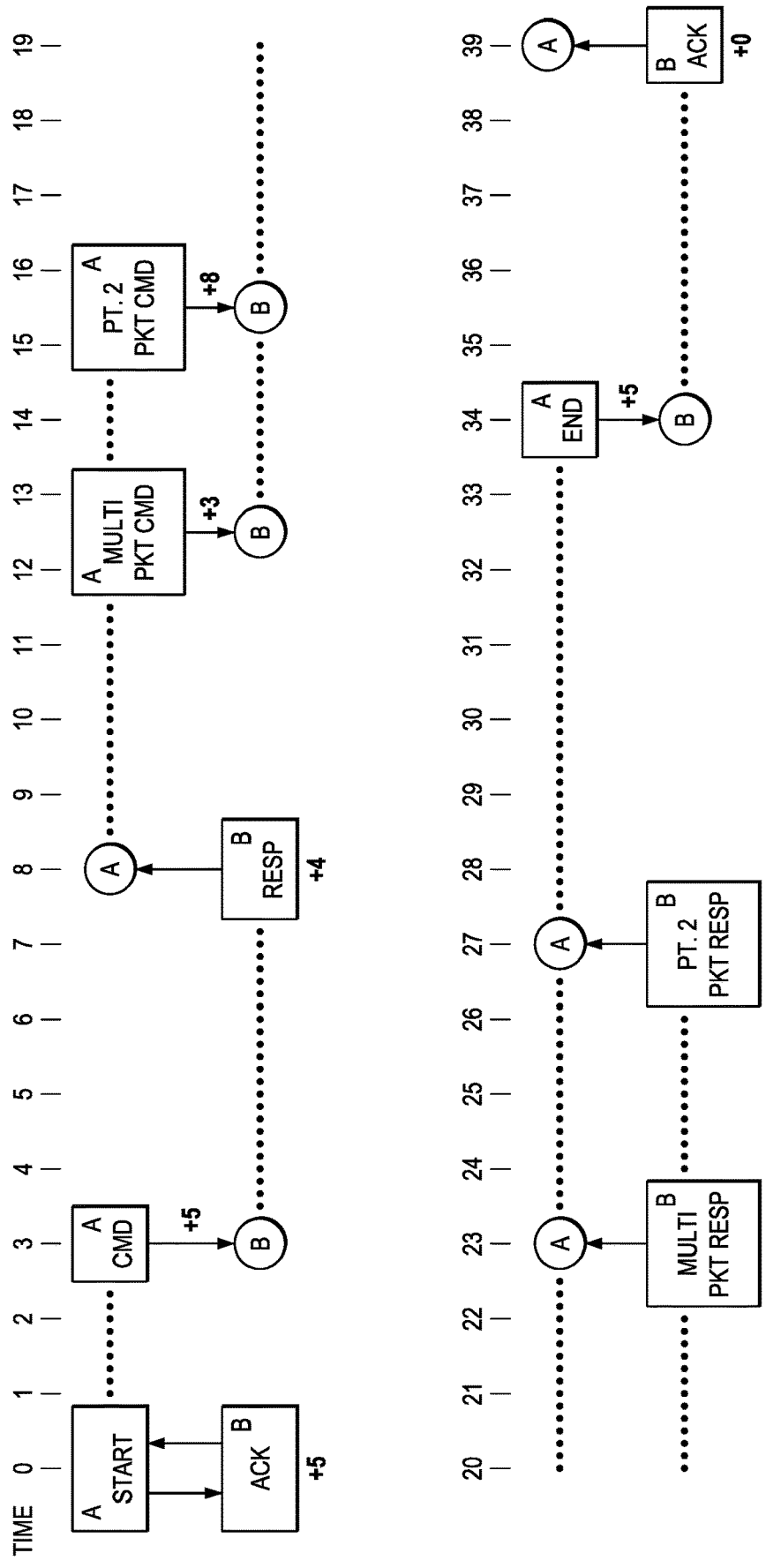
Figure 4:
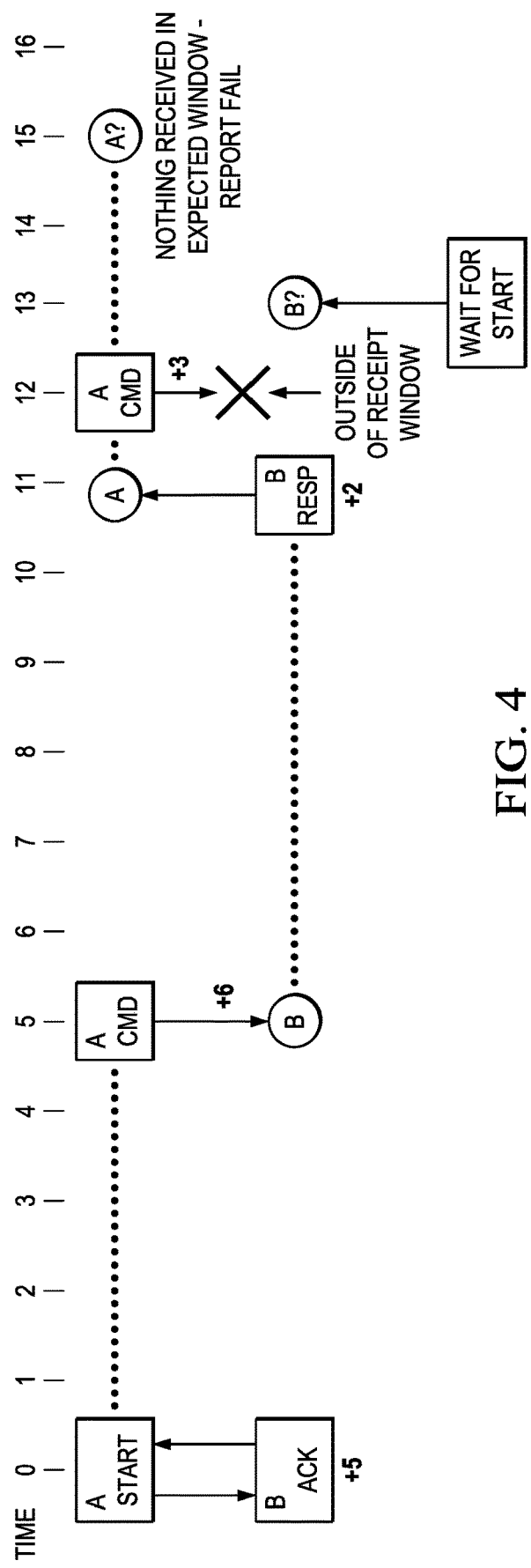

FIGS. 2, 3, and 4 are simple examples illustrating operation of the protocol. In these examples, the initiator is A and the recipient is B. Table 1 explains the simple exchange between A and B shown on the timeline of FIG. 2, Table 2 explains the simple exchange between A and B shown on the time line of FIG. 3, and Table 3 explains the simple exchange between A and B shown on the time line of FIG. 4.

TABLE 1

| Time | Action |
|---|---|
| 0 | A sends START to B, B responds to A with ACK and command time offset of 4 |
| 4 | A sends first command to B requesting multi-part key with response time offset of 5 |
| 9 | B sends multi-packet response to first command to A with next packet time offset of 3; multi-packet response includes first part of the key |
| 12 | B sends next packet to A with next packet time offset of 2 |
| 14 | B sends next packet to A with command time offset of 5 |
| 19 | A sends key received command to B with a response offset of 3 |
| 22 | B sends a key received ACK response to A with a command time offset of 6 |
| 28 | A sends END command to B with a response time offset of 4 |
| 32 | B sends ACK response to A with a command time offset of 0 indicating end |

TABLE 2

| Time | Action |
|---|---|
| 0 | A sends START to B, B responds to A with ACK and command time offset of 5 |
| 3 | A sends first command to B with response time offset of 5 |
| 8 | B sends response to first command to A with command time offset of 4 |
| 12 | A sends multi-packet command to B with next packet time offset of 3 |
| 15 | A sends next packet to B with response time offset of 8 |
| 23 | B sends multi-packet response to A with next packet time offset of 4 |
| 27 | B sends next packet to A with command time offset of 7 |
| 34 | A sends END command to B with a response time offset of 5 |

TABLE 2-continued

| Time | Action |
|---|---|
| 39 | B sends ACK response to A with a command time offset of 0 indicating end |

TABLE 3

| Time | Action |
|---|---|
| 0 | A sends START to B, B responds to A with ACK and command time offset of 5 |
| 5 | A sends first command to B with response time offset of 6 |
| 11 | B sends response to first command to A with command time offset of 2 |
| 12 | A sends command to B with next packet time offset of 3. The command is sent before the specified time window and B ignores the command. |
| 15 | A sends nothing from B since command was ignored |

Figure 5:
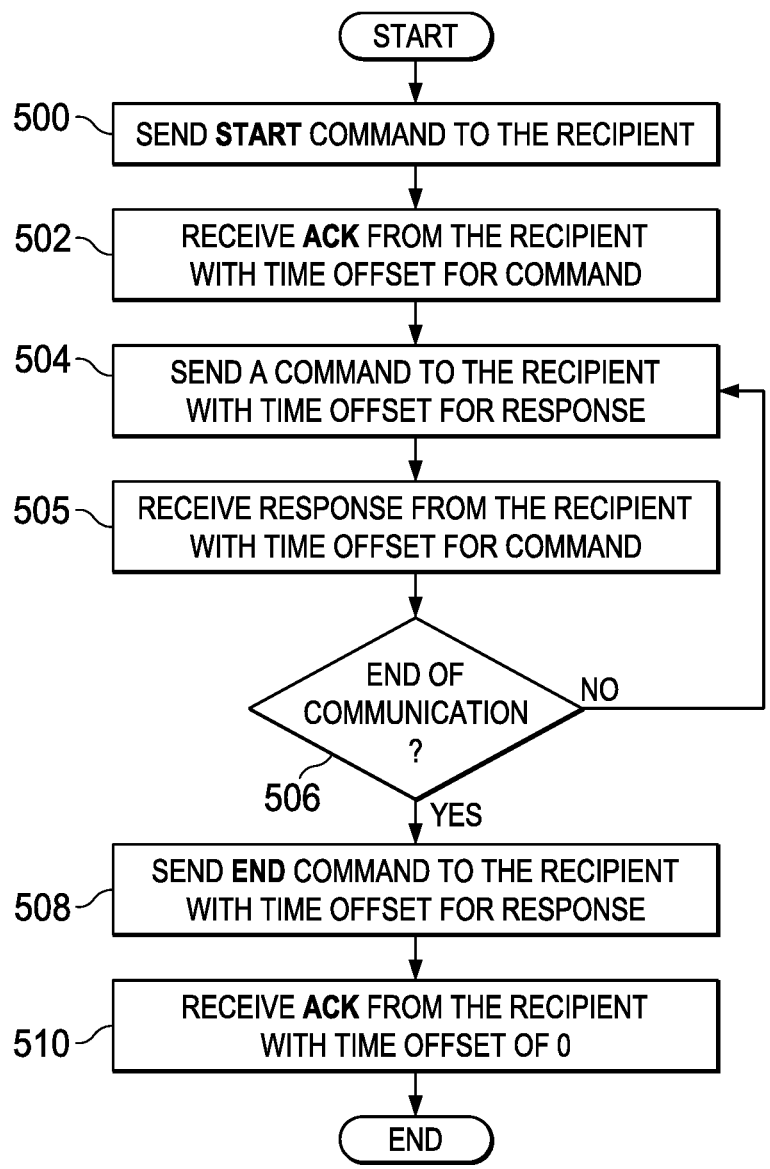
FIG. 5 is a flow diagram of a method for communication using the random time window protocol.

FIG. 5 is a flow diagram of a method for communication between an initiator and a recipient using a random time window protocol. In some embodiments, the initiator is a primary processor and the recipient is a secondary security processor on a multi-layer PCB as described in reference to FIG. 1. Initially, the initiator sends 500 a packet with a START command to the recipient to initiate a communication sequence. Responsive to the START command, the initiator receives 502 a packet with an ACK response from the recipient. The packet includes a randomly generated time offset for the beginning of the time window when the recipient will receive another command packet from the initiator. Time windows and randomly generated time offsets are previously described herein. The initiator then starts a command response communication sequence 504-506 in which the initiator sends 504 a command packet to the recipient with a randomly generated time offset for the beginning of the time window when the initiator will receive the corresponding response packet from the recipient and receives 505 a corresponding response packet from the recipient with a randomly generated time offset for the beginning of the time window when the recipient will receive another command packet from the initiator.

When the initiator determines 506 that the end of the communication has been reached, the initiator sends 508 a command packet with an END command to the recipient with a randomly generated time offset for the beginning of the time window when the initiator will receive the corresponding response packet from the recipient. The initiator sends the END command packet in the time window specified in the last response packet received from the recipient. Finally, the initiator receives 510 a packet with an ACK response from the recipient in the time window specified in the END command packet. The ACK response packet includes a time offset of 0 to indicate the end of communication with the initiator.

In some embodiments, a command from the initiator or a response from the recipient can initiate a multiple command packet transmission from the initiator or a multiple response packet transmission from the recipient. In such cases, as previously described herein, the initiator or recipient may send two or more packets to the opposite party before indicating that a respective response or command is expected.

In some embodiments, rather than the initiator sending an END command packet to the recipient to terminate the communication, the initiator may send a START command packet to the recipient, which operates to terminate the previous communication sequence and to initiate a new communication sequence.

The above method has been described assuming that all packets were received by the initiator and the recipient within the time windows specified by the randomly generated time offsets. One of ordinary skill in the art will understand embodiments in which the initiator recognizes an error has occurred if the recipient fails to send a packet in response to a command packet within the time window specified by the command packet. For example, the initiator may recognize that an error has occurred when a packet is not received within a time window where a packed is expected. The initiator may indicate a failure and return to the state where a START command packet may be sent. The recipient may also recognize an error when a command packet is received within a time window where no packet is expected. The recipient may terminate the communication sequence and return to the state where a START command packet may be received.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

For example, embodiments have been described herein assuming a single communication sequence between an initiator and a recipient. One of ordinary skill in the art will understand embodiments in which packets of two or more communication sequences between an initiator and recipient may be multiplexed. In some such embodiments, the initiator and the recipient is the same for all multiplexed packets.

In some such embodiments, the initiator of one communication sequence may be the recipient of another communication sequence. In other words, the initiator and recipient roles are not fixed, but can be performed by either end of the communication simultaneously as long as the role remains the same for a given communication sequence. For example, the initiator of communication sequence 1 with the recipient may be actively exchanging packets with the recipient and the recipient may decide to initiate a simultaneous communication sequence 2 on the interface. In this instance, communication sequence 1 has Initiator A and Recipient B, and communication sequence 2 has Initiator B with Recipient A, and the packets of the two communication sequences may be on the interface during the same overall time. To avoid conflicts, time windows are constrained such that only one packet is allowed in any given time window.

In another example, embodiments have been described herein in which the random time window protocol is used for communication between two processors on a multi-layer PCB. One of ordinary skill in the art will understand embodiments in which the protocol is used for communication over a wireless interface. In such embodiments, hackers can easily intercept any communication over the wireless interface, but packets may be individually encrypted and additional packets may be inserted in unused time windows to provide additional security. Such additional packets may be part of another unique communication between the initiator and the recipient, e.g., multiplexed packets, or may be packets of meaningless information outside the communication stream that appear to be valid packets, e.g., a form of hiding valid packets with numerous fake packets.

It is therefore contemplated that the appended claims will cover any such modifications of the embodiments as fall within the true scope of the invention.

What is claimed is:

1. A method for secure communication, the method comprising:
sending, by an initiator, a start command packet within a first time window, wherein the start command packet indicates initiation of a communication sequence, using a random time window protocol, wherein the start command packet does not include a randomly generated time offset;
receiving, by the initiator, an acknowledge command packet and a randomly generated first time offset within the first time window, wherein the randomly generated first time offset designates a start of a second time window occurring subsequent to the first time window;
in response to receiving the acknowledge command packet within the first time window, sending, by the initiator, a first command packet in the second time window and a randomly generated second time offset designating a start of a third time window subsequent to the second time window;
receiving in the third time window, by the initiator, a first response packet and a third time offset; and
in response to the third time offset having a value of zero, terminating, by the initiator, the communication sequence.

2. The method of claim 1, further comprising sending to a recipient by the initiator a second command packet indicating transmission of a plurality of sequential command packets, the second command packet comprising a randomly generated fourth time offset designating a start of a time window in which the initiator will send a next command packet in the plurality of sequential command packets to the recipient; and
sending to the recipient by the initiator a final command packet of the plurality of sequential command packets, the final command packet comprising a randomly generated fifth time offset designating a start of a time window in which the initiator expects to receive a response packet from the recipient.

3. The method of claim 1, further comprising:
receiving, by the initiator, a second response packet from a recipient, the second response packet indicating transmission of a plurality of sequential response packets, the second response packet comprising a randomly generated sixth time offset designating a start of a time window in which the recipient will send a next response packet in the plurality of sequential response packets to the initiator; and
receiving, by the initiator, a final response packet of the plurality of sequential response packets, the final response packet comprising a randomly generated seventh time offset designating a start of a time window in which the recipient expects to receive a subsequent command packet from the initiator.

4. The method of claim 1, wherein the initiator is a primary processor comprised in a multi-layer printed circuit board (PCB) and a recipient is a secondary security processor comprised in the multi-layer PCB, wherein the primary processor is coupled to the second security processor via an inter-processor connection in an internal layer of the multi-layer PCB and command and response packets are sent and received via the inter-processor connection.

5. The method of claim 1, wherein the initiator and a recipient communicate via a wireless interface.

6. The method of claim 1, wherein a predetermined variance around designated start times of time windows is used to compensate for variance between a time base of the initiator and a time base of a recipient.

7. An apparatus comprising:
a memory configured to store data; and
a primary hardware processor coupled to the memory, wherein the primary hardware processor is configured to:
send a start command packet within a first time window, wherein the start command packet indicates initiation of a communication sequence, using a random time window protocol, wherein the start command packet does not include a randomly generated time offset;
receive an acknowledge command packet and a randomly generated first time offset within the first time window, wherein the randomly generated first time offset designates a start of a second time window occurring subsequent to the first time window;
in response to receiving the acknowledge command packet within the first time window, send a first command packet in the second time window and a randomly generated second time offset designating a start of a third time window subsequent to the second time window;
receive in the third time window a first response packet and a third time offset; and
in response to the third time offset having a value of zero, terminate the communication sequence.

8. The apparatus of claim 7, wherein the primary hardware processor is further configured to:
send a second command packet to a secondary security hardware processor indicating transmission of a plurality of sequential command packets, the second command packet comprising a randomly generated fourth time offset designating a start of a time window in which the primary hardware processor will send a next command packet in the plurality of sequential command packets to the secondary security hardware processor; and
send a final command packet of the plurality of sequential command packets to the secondary security hardware processor, the final command packet comprising a randomly generated fifth time offset designating a start of a time window in which the primary hardware processor expects to receive a response packet from the secondary security hardware processor.

9. The apparatus of claim 7, wherein the primary hardware processor is further configured to:
receive a second response packet from a secondary security hardware processor, the second response packet indicating transmission of a plurality of sequential response packets, the second response packet comprising a randomly generated sixth time offset designating a start of a time window in which the secondary security hardware processor will send a next response packet in the plurality of sequential response packets to the primary hardware processor; and
receive a final response packet of the plurality of sequential response packets, the final response packet comprising a randomly generated seventh time offset designating a start of a time window in which the secondary security hardware processor expects to receive a subsequent command packet from the primary hardware processor.

10. The apparatus of claim 7, wherein a secondary security hardware processor and the primary hardware processor are comprised in a multi-layer printed circuit board (PCB), wherein the primary hardware processor is coupled to the second security hardware processor via an inter-processor connection in an internal layer of the multi-layer PCB and command and response packets are sent and received via the inter-processor connection.

11. The apparatus of claim 7, wherein the primary hardware processor is coupled to a secondary security hardware processor via a wireless interface.

12. The apparatus of claim 7, wherein a predetermined variance around expected start times of time windows is used to compensate for variance between a time base of the primary hardware processor and a time base of a secondary security hardware processor.

13. An apparatus comprising:
a first hardware processor configured to use a random time window protocol for communication with a second hardware processor; and
the second hardware processor coupled to the first hardware processor via a communication interface, the second hardware processor configured to use the random time window protocol for communication with the first hardware processor;
wherein:
the random time window protocol is a command response protocol in which each command packet of a plurality of command packets and each response packet of a plurality of response packets in a communication sequence between an initiator and recipient comprises a time offset designating a start of a time window for transmission of a next packet;
each time offset is randomly generated except for a time offset value of an end acknowledgement response packet;
the random time window protocol comprises a start command packet for starting a communication sequence by the initiator, a start acknowledgement response packet for acknowledging the start command packet by the recipient, an end command packet for ending a communication sequence by the initiator, and the end acknowledgement response packet for acknowledging the end command packet by the recipient;
the start command packet does not include a randomly generated time offset;
the start acknowledgment response packet is generated by the recipient in response to the recipient receiving the start command packet, and the start acknowledgment response packet includes a randomly generated time offset designating a start of a time window for transmission of a subsequent command packet by the initiator;
the recipient transmits the start acknowledgment response packet to the initiator;
the end command packet includes a randomly generated time offset designating a start of a time window for transmission of the end acknowledgment response packet by the recipient; and
the end acknowledgement response packet includes a time offset value of zero indicating end of communication with the initiator.

14. The apparatus of claim 13, wherein the random time window protocol comprises a command packet for initiating transmission of a plurality of sequential command packets to the recipient, wherein each command packet of the plurality of sequential command packets except a final command packet comprises a randomly generated time offset designating a start of a time window in which the next command packet of the plurality of sequential command packets will be transmitted by the initiator.

15. The apparatus of claim 13, wherein the random time window protocol comprises a response packet for initiating transmission of a plurality of sequential response packets to the initiator, wherein each response packet of the plurality of sequential response packets except a final response packet comprises a randomly generated time offset designating a start of a time window in which the next response packet of the plurality of sequential response packets will be transmitted by the recipient.

16. The apparatus of claim 13, wherein the communication interface is an inter-processor connection in an internal layer of a multi-layer printed circuit board (PCB) comprising the first hardware processor and the second hardware processor.

17. The apparatus of claim 13, wherein the communication interface is a wireless interface.

* * * * *